United States Patent Office 3,244,695
Patented Apr. 5, 1966

3,244,695
CATIONIC ETHERS OF XANTHOMONAS HYDROPHILIC COLLOIDS
Richard G. Schweiger, San Diego, Calif., assignor to Kelco Company, San Diego, Calif., a corporation of Delaware
No Drawing. Filed Oct. 11, 1963, Ser. No. 315,689
7 Claims. (Cl. 260—209)

This invention relates to the treatment of Xanthomonas hydrophilic colloid so as to make it cationic, and to the product derived by the process.

Xanthomonas hydrophilic colloid is a biosynthetic polysaccharide elaborated by various species of the Xanthomonas genus of bacteria, wherein said bacteria operate on a substrate of glucose or equivalent sugar. It is a polysaccharide of substantial molecular weight, composed of glucose, mannose, and glucuronic acid with approximately each one-fourth unit of the polymer containing one acetyl group.

Xanthomonas hydrophilic colloid disperses or dissolves in water to give solutions of greatly increased viscosity, and in that respect it is similar to various other natural gums. When in aqueous dispersion the colloidal micelles are negatively charged, and will, for example, migrate toward the anode during electrophoresis. Likewise, if an aqueous solution of Xanthomonas hydrophilic colloid is brought into contact with a solid surface having an inherently positive charge, then adsorption and indeed a type of chemisorption takes place. Contrarywise, if and aqueous solution of Xanthomonas hydrophilic colloid is brought into contact with a solid surface which is inherently negatively charged, then electrostatic forces will in general prevent any adsorption and adsorption will take place only through the operation of other mechanisms, which may include hydrogen bonding in some cases and the like.

In a number of applications where it is desired to make use of the unique properties of Xanthomonas hydrophilic colloid, adsorption onto a solid material to be treated may be negligible in extent because of the negative charge of the material to be treated. This is of substantial importance, because many materials which are sized, and for which Xanthomonas hydrophilic colloid would provide a particularly desirable sizing agent, are negatively charged. This includes paper, paperboard, cotton, linen, and indeed many other textiles, including burlap, sisal, hemp, and the like.

An object of the present invention is to provide a process of treating Xanthomonas hydrophilic colloid so that it is rendered cationic in aqueous dispersion or solution, and to provide the product resulting from said process.

Other objects of the invention will become apparent as the description thereof proceeds.

Generally speaking, and in accordance with various illustrative embodiments of my invention, I react Xanthomonas hydrophilic colloid in an alkaline environment with a tertiary amine, in which two of the substituents are alkyl radicals having from one to five carbon atoms, and the third substituent is a chloroalkyl radical, in which again there are five carbon atoms in the chloroalkyl group with the chlorine atom present on any one of the carbon atoms. The tertiary amines which I use will be discussed more fully hereinbelow, with preferred species being disclosed. The dialkyl, monochloroalkyl-amine reacts with a hydroxyl group of Xanthomonas hydrophilic colloid with the elimination of the chlorine atom as sodium chloride in view of the alkaline environment. At the same time, the Xanthomonas hydrophilic colloid is deacetylated, the alkaline environment which I use for the coupling of the alkyl amine serving at the same time as a hydrolyzing agent for the acetyl group.

The Xanthomonas hydrophilic colloid itself is prepared from suitable species of the bacterium Xanthomonas, by known methods. Indeed, Xanthomonas hydrophilic colloid is an article of commerce, and may be purchased from the Kelco Company, San Diego, California.

The Xanthomonas hydrophilic colloid, by way of illustration, may be prepared by using the bacterium *Xanthomonas campestris*, by whole culture fermentation of a medium containing 2-5 percent commercial glucose, organic nitrogen source, dipotassium hydrogen phosphate and appropriate trace elements. The incubation time of the final medium is approximately 96 hours at 30° C. aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose growth may be made and the bacterial cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing *Xanthomonas campestris* hydrophilic colloid, a loopful of organism from the agar slant is adequate for the first stage comprising 200 milliliters of the said glucose medium. In the second stage the material resulting from the first stage may be used together with 9 times its volume of a 3% glucose medium. In the final stage the material produced in the second stage may be admixed with 19 times its volume of the final medium. A good final medium may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be suitable for my purpose can be recovered and sterilized by precipitation in methanol of the clarified mixture from the fermentation. This resulting material may also be designated as a pseudoplastic, heteropolysaccarbide hydrophilic colloid or gum produced by the bacterium species *Xanthomonas campestris*.

Xanthomonas hydrophilic colloid is, as stated, made preferably from *Xanthomonas campestris*. The term "Xanthomonas hydrophilic colloid," as used herein and in the claims which follow, includes however equivalent materials made by other suitable species of Xanthomonas bacteria, and these may be utilized with almost equal success in many instances. Such other species are *Xanthomonas begoniae, X. malvacearum, X. carotae, X. incanae, X. phaseoli, X. vesicatoria, X. papavericola, X. translucens, X. vasculorum, X. hederae,* and others. These are all included in the scope of my invention.

The tertiary amine which I use is any one of the group hereinbefore specified. While any member of the group already defined may be used, it is of course to be expected that some will react more readily than others, and moreover that some will give end products differing somewhat from those yielded by other members of the group. It will be helpful to point out the factors underlying both reactivity and end product properties, as an aid to those desiring to practice the invention. In the first place, while as stated all of the alkyl groups including the chloroalkyl group may have as many as five carbon atoms, it will be found that if this is the case for all three, reaction is slow, and moreover, the end product is not as hydrophilic as is the case when all of the alkyl groups including the chloroalkyl group are shorter chains, such as ethyl or propyl. An α-chloro substitution gives good reactivity, but β-chloro substitution, or generally omega-chloro substitution may be utilized, although the latter apparently react more slowly. However, where the chloroalkyl is chloropropyl, I find that β-chloro substitution furnishes adequate reactivity.

My preferred tertiary amines are the following:

2-chloro-(N,N-dimethyl)ethylamine
2-chloro-(N,N-diethyl)ethylamine
2-chloro-(N,N-dimethyl)propylamine
2-chloro-(N,N-diethyl)propylamine
3-chloro-(N,N-dimethyl)propylamine
3-chloro-(N,N-diethyl)propylamine The alkali which I use to provide an alkaline medium is preferably sodium hydroxide although lithium hydroxide or potassium hydroxide or the like may also be used. The latter are more expensive and offer no practical advantages. The liquid vehicle is water, and although this could be supplemented with various simple water miscible solvents such as methanol or ethanol there appears to be no advantage in so proceeding.

In carrying out the treatment in accordance with the invention, I bring the Xanthomonas hydrophilic colloid and the amine together in the alkaline medium. An elevated temperature is preferable in order to give reasonably short reaction times. A preferred procedure, and one which I find best, is to first mix the Xanthomonas hydrophilic colloid and the amine, the latter in salt form, with the water, and then add a fairly concentrated aqueous solution of sodium hydroxide stepwise over an extended period of time, maintaining the temperature throughout at, for example, 40° C. to 50° C. The amount of sodium hydroxide used is that calculated to be sufficient for deacetylation of the gum for the production of the free amine from the salt, and for the reaction to take place. After the addition of the sodium hydroxide has been completed in this fashion, and a homogeneous mixture has been obtained, the reaction mixture is maintained at the elevated temperature for several additional hours until the reaction has run to completion.

A convenient method of recovering the product from the reaction mixture is to cool it to room temperature and mix it with methyl alcohol whereby he cationic hydrophilic colloid is precipitated and may be washed with 80% aqueous methanol and eventually dried and ground. The degree of substitution obtained, as estimated from nitrogen assay, ranges between about 0.05 and 0.4. Higher degrees of substitution are obtained only with difficulty and they are uneconomical and offer no evident advantages. At the degrees of substitution obtained in accordance with my invention, however, namely, between about 0.05 and 0.4, the inventive product differs greatly from the starting material. It is only partially soluble in water under alkaline conditions. When neutralized with organic acids or mineral acids such as acetic or hydrochloric acids or the like, the products produced in accordance with the invention from solutions having good clarity, and even at pH values as low as one, no precipitate is formed. Moreover, aqueous solutions of my inventive products are uniformly much clearer than those of the starting material.

As already noted, my inventive products have great utility in various applications, particularly in the preparation of sizings. The high stability of the inventive products and especially their good solubility at low pH's makes it possible to formulate sizes usable under conditions where other polysaccharides precipitate or degrade to a high degree.

Some examples will now be given illustrating the operation of my invention.

*Example I*

50 g. of Xanthomonas hydrophilic colloid derived from *Xanthomonas campestris* in the fashion already described is mixed with 50 cc. of water and 43 g. of 2-chloro-(N,N-diethyl)-ethylamine hydrochloride until homogeneous. The temperature is adjusted to 40° C. and a solution of 21 g. of sodium hydroxide in 25 cc. of water is added over a period of about 30 minutes with mixing. After another 30 minutes of mixing the product is placed in an oven at 55° C. for 3 hours and at 105° C. for 1 hour. The product is then precipitated by mixing thoroughly with methanol. The precipitate is extracted with 80% aqueous mehanol for 20 hours in a Soxhlet apparatus and dried.

Analysis: 1.96% N; blank (Xanthomonas hydrophilic colloid treated with sodium hydroxide only) 0.6% N.

The difference of these values corresponds to a D.S. of 0.2–0.25.

*Example II*

(a) The experiment above is repeated, however 40 g. of the Xanthomonas hydrophilic colloid described in Example I, 70 g. of amine hydrochloride, and 34 g. of sodium hydroxide were used. After mixing, it was kept at 55° C. for 1 hour and at 105° C. for 3 hours.

Analysis: 2.2% N.

(b) 50 g. of the Xanthomonas hydrophilic colloid described in Example I, 21.5 g. of amine hydrochloride, and 10.5 g. of sodium hydroxide were used in this example. All other conditions were as described under II (a).

Analysis: 1.9% N.

*Example III*

50 g. of Xanthomonas hydrophilic colloid was reacted with 36.2 g. of 2-chloro-(N,N-dimethyl)-ethylamine hydrochloride using 21 g. of sodium hydroxide. All other reaction conditions were the same as described under II.

Analysis: 1.12% N.

*Example IV*

50 g. of Xanthomonas hydrophilic colloid was reacted with 31 g. of 2-chloro-(N,N-dimethyl)-propylamine hydrochloride using 21 g. of sodium hydroxide under conditions described above. After isolation of the product and extraction with 80% methanol an analysis indicated 0.8% N.

In view of the method of coupling of the chloroalkyl amine to the Xanthomonas hydrophilic colloid which takes place, it will be apparent that the product obtained when following my invention may be described as a deacetylated N,N-dialkyl amino alkoxy Xanthomonas hydrophilic colloid. Thus, if X—OH represents a hydroxyl group originally present on the Xanthomonas polymer, in alkaline solution it is effectively converted to X—ONa, and this reacts with the chlorine atom of the chloroalkyl group of the amine so that NaCl is eliminated, so that the final coupling may be represented as X—O—R—, that is, alkoxy.

It will be apparent that many variations can be employed in the procedure of my invention, although it has been described with the aid of specific materials, reaction conditions, and the like. The invention is a broad one, within the scope set forth in the claims which follow.

I claim:

1. The process of producing a cationic derivative from Xanthomonas hydrophilic colloid which comprises, bringing together in an aqueous alkaline medium said colloid together with a monochloro-(N,N-dialkyl)-alkylamine in which each of the three aforesaid alkyl radicals has from one to five carbon atoms and maintaining the reaction mixture so formed at a temperature permitting reaction for a long enough period of time to permit the deacetylation of said colloid and the coupling of said amine thereto to a degree of substitution within the range of about 0.05 to about 0.4.

2. The process in accordance with claim 1 wherein said amine is a chloro-(N,N-dimethyl)-ethylamine.

3. The process in accordance with claim 1 wherein said amine is a chloro-(N,N-diethyl)-ethylamine.

4. The process in accordance with claim 1 wherein said amine is a chloro-(N,N-dimethyl)-propylamine.

5. The process in accordance with claim 1 wherein said amine is a chloro-(N,N-diethyl)-propylamine.

6. The process of claim 1 in which the Xanthomonas hydrophilic colloid is a *Xanthomonas campestris* hydrophilic colloid.

7. Deacetylated N,N-dialkyl amino alkoxy Xanthomonas hydrophilic colloid in which said alkyl and said alkoxy each have from one to five carbon atoms.

References Cited by the Examiner

UNITED STATES PATENTS 3,163,602 12/1964 Lindblom et al. ------ 260—209

LEWIS GOTTS, *Primary Examiner.*